United States Patent [19]

Wagner

[11] Patent Number: 5,723,936
[45] Date of Patent: Mar. 3, 1998

[54] BATTERY ISOLATOR BRACKET HEAT SINK

[75] Inventor: Thomas E. Wagner, Kirkwood, Mo.

[73] Assignee: Wagner Product Co., Kirkwood, Mo.

[21] Appl. No.: 492,406

[22] Filed: Jun. 19, 1995

[51] Int. Cl.[6] .............. H02K 11/02; H02K 1/32; H02M 1/00
[52] U.S. Cl. .............. 310/68 D; 310/64; 310/91; 363/141; 363/145
[58] Field of Search .............. 310/680, 71, 89, 310/91, 64; 363/141, 145

[56] References Cited

U.S. PATENT DOCUMENTS

| | | | |
|---|---|---|---|
| 4,161,775 | 7/1979 | Franz et al. | 363/145 |
| 4,169,282 | 9/1979 | Allport et al. | 363/145 |
| 4,606,000 | 8/1986 | Steele et al. | 363/145 |
| 4,720,645 | 1/1988 | Stroud | 310/68 D |
| 4,835,427 | 5/1989 | Bohm et al. | 310/38 D |
| 4,952,829 | 8/1990 | Armbruster et al. | 310/68 D |
| 5,043,614 | 8/1991 | Yockey | 310/68 D |
| 5,451,823 | 9/1995 | Deverall et al. | 310/68 D |
| 5,453,648 | 9/1995 | Bradfield | 310/71 |

*Primary Examiner*—Steven L. Stephan
*Assistant Examiner*—Michael Wallace, Jr.
*Attorney, Agent, or Firm*—Paul M. Denk

[57] ABSTRACT

A battery isolator alternator bracket incorporating one or more heat sinks comprising at least one heat sink, the bracket formed of two segments, an upper closure segment, and lower base segment, the heat sinks formed preferably of extruded aluminum are shaped to conform to the interior of the bracket, each heat sink including a finned heat exchanger, having a terminal connecting at its front, being in electrical contact with a button diode, adhered thereto, with the terminals of each heat sink connecting either directly or by cable to the battery post of the alternator, for transmission of charge to the various batteries during alternator electrical generation.

9 Claims, 3 Drawing Sheets

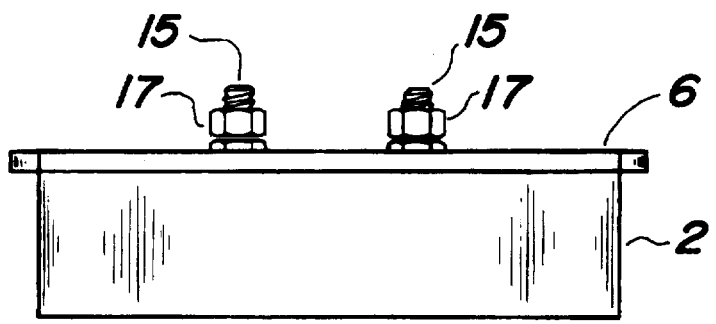
FIG. 4
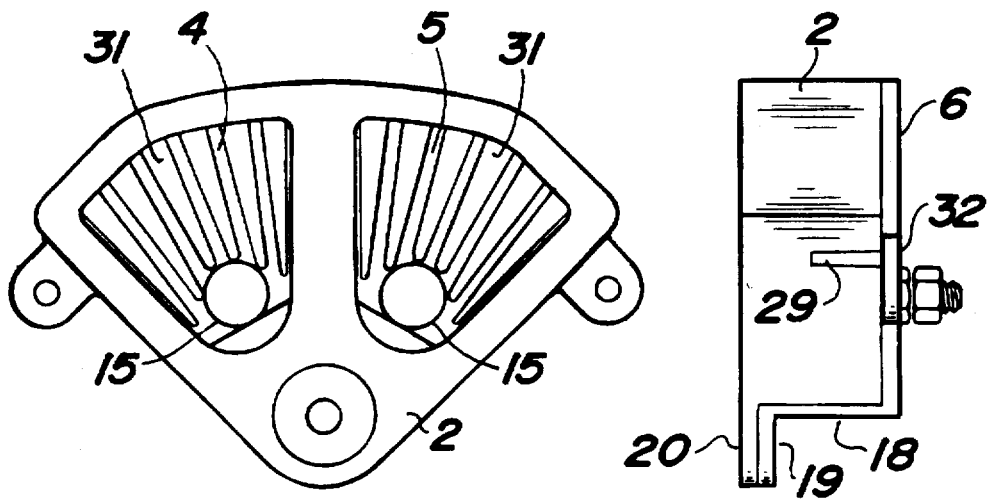
FIG. 5
FIG. 6
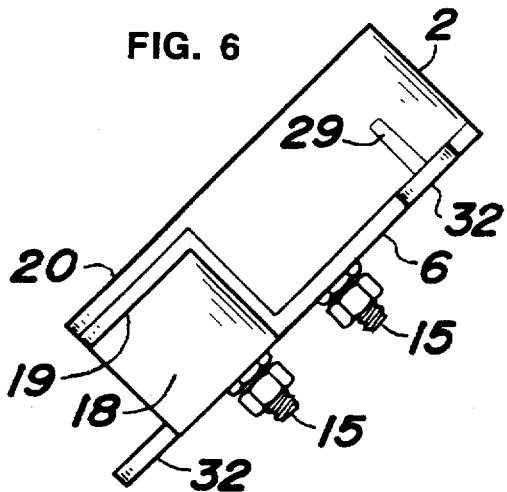
FIG. 7

BATTERY ISOLATOR BRACKET HEAT SINK

BACKGROUND OF THE INVENTION

As is well known, batteries have long been used to power the ignition means for many vehicles, such as RVs, and motorboats, whether they be of the small outboard type, powered by an outboard motor, or the luxury cruisers that require extensive electrical power to attain ignition, in addition to recharging of all batteries during recreational usage. Since gasoline powered boats and recreational vehicles were invented, there has always existed the need to isolate two or more batteries, as used in conjunction therewith. The need exists because while one may stop the engine, as for example, when the batteries are used in conjunction with a recreational vehicle, as at a camp, or during usage of a trolling motor as in a fishing boat, or during an anchor-out application of a pleasure boat, electrical charge is still being used from the vehicle's batteries. Extended usage will cause one or more of the batteries to become discharged, which will disable the vehicle or boat, render it inoperative, and stranded frequently at some isolated location.

The first method used to regulate batteries, and to solve this problem was to use a manual battery switch. Typically, a high amperage switch with four switch positions has been used to selectively connect two batteries to an alternator's output. The switch positions typically are labeled: "0 or none", "One", "Two", and "Both". In a typical hook-up, the battery No. 1 would be used for starting the engine only, while the battery No. 2 would be used for operation of all other accessories. When the engine is running the switch could be set to "Both", in order to charge both batteries. After stopping, the engine switch would be set to 0, 1, or 2 in order to prevent the accessories from draining the starting battery.

The problems with the prior art systems are numerous. First of all, the switch needs to be manually operated, which in and of itself, causes problems. All the operator needs to do is forget to operate the switch once, and it can cause stranding of the vehicle. Secondly, the switch is confusing to operate for someone that does not have a thorough background, including electrical background, relating to this type of control. For example, if the battery switch is set on 2, and battery 2 becomes completely discharged, when the switch is changed to "both," since battery 1 will discharge through the switch into battery 2, leaving both batteries half charged. At this point, both batteries may not have enough power to restart the engine. Thirdly, switching the alternator output from battery to battery with the engine running may cause premature alternator failure.

To avoid these problems, and to create a more "foolproof" system, battery isolators have been developed. The typical battery isolator consists of two or more heavy-duty diodes connected to a large heat sink, with potting epoxy. The alternator output is connected to the center post, which feeds the two diodes, which in turn, feeds the two battery output posts. The advantages over the previous type of manually operated switch are, firstly, it operates automatically, and secondly, it prevents the starting battery from accidentally discharging into the accessory battery, as both batteries are feed through a blocking diode.

The problems with this type of system are numerous though, in that it is expensive, and it is bulky and requires a fair quantity of space to provide a mounting area, and extensive wiring. Additionally, if the voltage sensing lead from the alternator is not connected to the battery positive post, the batteries will not be fully charged due to the 0.6 volt drop across the diode contained in the isolator.

Of more recent origin, a newer type of isolation device called a battery relay has been introduced. This device senses the presence of the charge produced at the alternator output, and engages the relay to allow the alternator to charge both batteries. This system eliminates the voltage drop experienced with the battery isolator systems without the sensing lead (such as outboard magnet/stator systems) but still has the mounting and wiring problems associated with the large type battery isolator. It is also very expensive and requires an elaborate electronic unit, and does not have a widespread appeal due to this cost factor.

SUMMARY OF THE INVENTION

As a result of the foregoing, this current invention provides a new type of battery isolator which mounts directly onto the alternator, or on a nearby surface. Hence, it is the principal object of this invention to provide a significant improvement in bantery isolation so as to assure efficiency in operation, and enhanced battery recharging during alternator functioning.

This current invention utilizes two heavy-duty diodes that are soldered or otherwise connected to compact aluminum or other metallic heat sinks, which are insulated from each other, and the alternator case by means of unique bracketing, formed of insulated material, such as a polymer, to provide improved operations. This arrangement minimizes the additional wiring necessary by eliminating the wire from the alternator to the isolator, and by allowing the battery voltage to be sensed at the alternator. In addition, it elminates the need to find a mounting location, since the device can be mounted directly onto the alternator. Finally, the cost of this unit is substantially less than anything currently available upon the market.

The essence of this invention is the formation of an isolator bracket, that incorporates a heat sink means, which may locate two or more heat sinks, with each heat sink having a diode directly mounted thereto, to provide for the desired isolation. The diode, of each heat sink, provides for the required isolation of the various batteries with respect to each other, and the alternator, to which the bracket connects. The bracket is formed of first and second segments, the first segment providing a base, into which one, two or more of the isolating diodes may locate, and which is disposed for cooperating with the battery post formed extending from the alternator, for stabily mounting directly thereto, to provide a convenient disposition for the isolator, in the form of its diode and its contiguous heat sink, which provides for dissipation of the excessively generated heat. The isolator heat sink mounts directly onto the alternator, requiring little or no wiring, to achieve its immediate operations. As is known, diodes used for isolation in conjunction with alternators, particularly those used in combination with recreational vehicles, or boats, can conduct upwards to 60 to 70 amps of current, during their functioning, and frequently the temperatures of the diodes may achieve degrees in excess of 200° F., which, as can be readily understood, lead to burn out and failure. This is the last thing the owner of a RV vehicle, or a luxury boat, needs when visiting out in the wilderness or at other remote locations. Hence, the heat sink of this current invention may be formed of a metallic composition, such as aluminum, and rapidly provides for dissipation of heat from the diode during its functioning. In addition, the isolator bracket that houses two or more of the diodes, and their associated heat sinks, is usually formed of a nonconductive material, such as a polymer, to provide for electrical isolation of the various diodes from each other, during usage.

Means are furnished within the isolator bracket to provide for stable mounting of the heat sinks therein, such as various mounting columns, whether they be integrally formed within the bracket, or projecting therefrom, and which cooperate with slots provided upon the extruded heat sinks, to furnish secure mounting of the heat sinks therein, during installation, or vice versa of construction. In addition, each heat sink has a terminal extending therefrom, and which connects in proximity with the mounted diode, to provide for the conduct of electrical charge from the alternator, through its battery post, to the terminal, and directly through the diode, and to the heat sink, and for then connecting with electrical wiring for conduct of charge to their various batteries. Each bracket, whether it contains two or more heat sinks, and associated diodes, because of the unique disposition of the heat sinks within the bracket, orient their terminals for overlapping disposition for conventiently centering of their connecting slots in alignment onto the alternator battery post, for convenience of installation.

It is, therefore, the principal object of this invention is to provide a convenient isolator bracket, containing one, two or more heat sinks, control isolating diodes, and which conveniently mounts directly onto an end of the alternator, for providing the necessary isolation required to attain efficient battery operation and functioning.

Another object of this invention is to provide a uniquely formed heat sink, conductive of heat, and which mounts within a specifically designed bracket, being nonconductive of electrical charge, for use for regulating the conduct of charge from an alternator.

Another object of this invention is to provide a unique bracket, for use in combination with an alternator, and which conveniently mounts one, two or more heat sinks, that can be readily replaced, including any diode that may become burned out or rendered inoperative, in a minimum of time.

A further object of this invention is to provide a battery isolating means that can be quickly and conveniently mounted onto the alternator, or even onto a nearby supporting surface.

These and other objects will become more apparent to those skilled in the art upon reviewing the summary of this invention, and upon undertaking a study of the description of the preferred embodiment, in view of the drawings.

BRIEF DESCRIPTION OF THE DRAWINGS

In referring to the drawings, FIG. 1 provides a perspective view of the alternator isolator bracket of this invention, shown mounted upon the standard alternator, the latter which is partially disclosed in phantom line;

FIG. 4 is a back view thereof;

FIG. 5 is a bottom view thereof;

FIG. 6 is a right side view of the invention;

FIG. 7 is an oblique right side view of the bracket; and

DESCRIPTION OF THE PREFERRED EMBODIMENT

Figure 1:
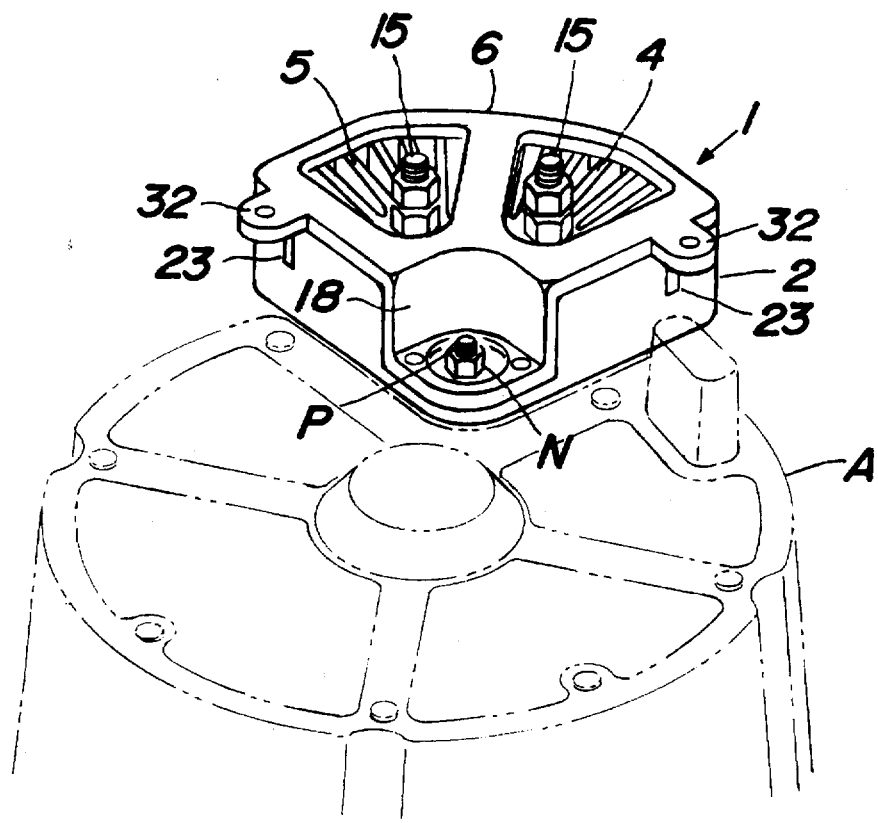
Figure 2:
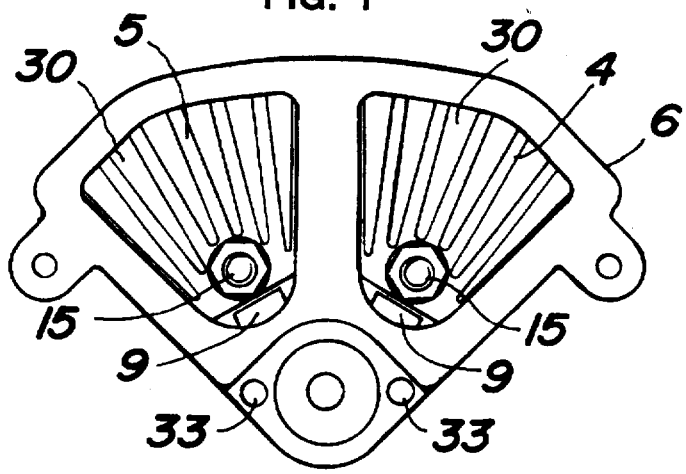
FIG. 2 provides a top view of the alternator bracket.
Figure 3:
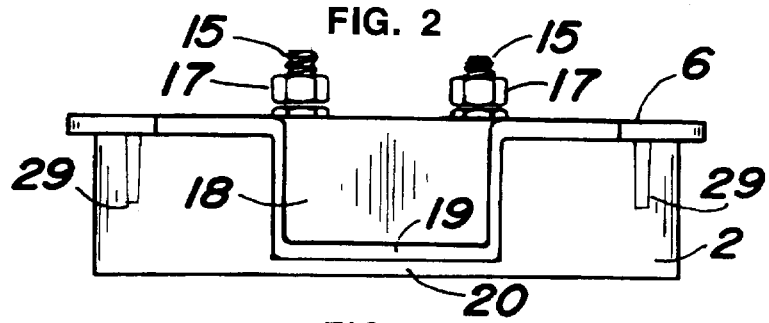
FIG. 3 provides a front view thereof.

In referring to the drawings, and in particular FIGS. 1 through 7, the alternator isolator bracket 1 of this invention is disclosed, as mounted upon the alternator battery post P as shown. The bracket is formed generally as an arc shaped member, so that it can be conveniently accommodated onto an end segment of the shown alternator A, when mounted into position, upon its battery post.

Figure 8:
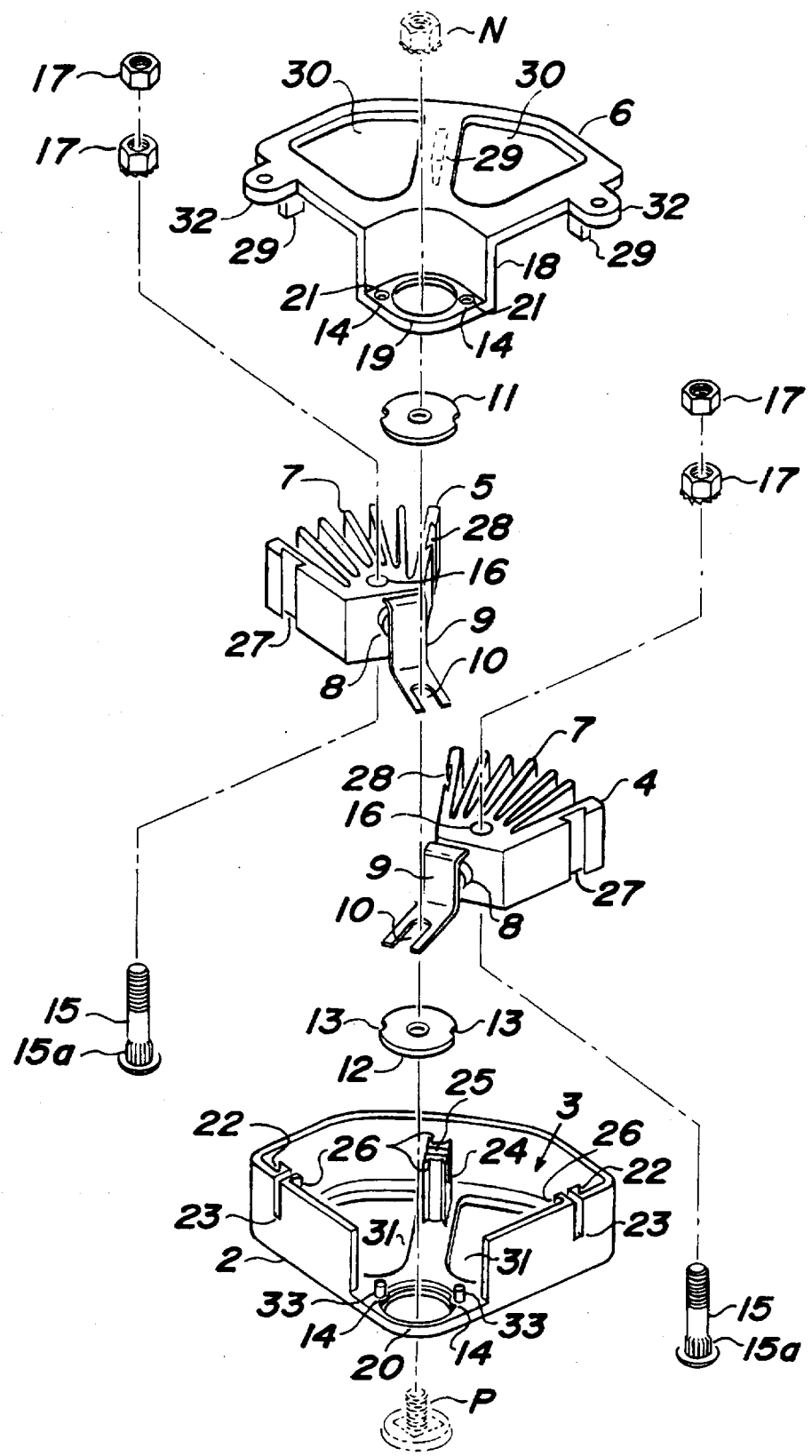
FIG. 8 is an exploded view of the bracket, its heat sinks, their diodes, and other components, during assembly.

The specific components that make up the alternator mounted bracket and isolator of this invention are more aptly disclosed in FIG. 8. As can be seen, the bracket is formed having a first segment forming a base or housing 2, which has generally the shape as previously defined, and has an opened interior, as at 3, for accommodating one or more of the unique heat sinks 4 and 5 of this invention. A second segment for the bracket, or its top cover 6, conveniently fits over the base 2, when the heat sinks have been located therein, upon completion of the installation. As can be noted, when the cover 6 and the base 2 are connected together, they are held into this position by means of the alternator battery post P, and its fastening nut N, into associated securement.

Each of the heat sinks 4 and 5 undertake a rather fan shaped configuration, and includes a series of integral radially disposed fins 7 which are designed for dissipation of the heat generated at the diodes 8 during usage of the isolator. Secured to the diode, but not directly to the heat sink, there is connected a terminal 9 which extends forwardly and downwardly into a bifurcated segment 10, for embracing the alternator battery post P, during their connection. These terminals fit intermediate a pair of specially designed washers 11 and 12. Each washer has a notched edge, diametrically arranged, as at 13, for fitting onto the locating bosses 14 integrally formed as a counterbore during molding of the base 2. The configuration is also formed into the undersurface of the cover 6, also as at 14. There is a terminal screw 15 that fits through the respective apertures 16 formed through each heat sink, and it is to this screw that the wire leads may connect for extending to their respective batteries, and which are held in place by means of the fastening nuts 17 and the ribbed necks 15a on the terminal screws 15. Thus, electrical connection with the alternator is made through the terminals 9, which electrically connect with the diodes 8, which diodes provide for one way flow in the transfer of any generated charge, with the charge then passing through the heat sinks 4 and 5 to the terminal screws 15, for conduct through their respective electrical wiring (not shown), to the various batteries.

In the assembly of the bracket together, through the locating of its cover 6, upon the base 2, it can be seen that the cover has a depressed portion 18, integrally formed, and which extends downwardly to form a lower surface 19, and which comes into contiguity upon the frontal base 20, of the base 2. A pair of apertures are provided within the portion 19, as can be seen at 21, and which locate upon the locating post 33, of the base, for alignment as can be seen. The locating posts 33 are then staked or crimped using heat, ultrasonic energy or other means to provide a secure attachment between the base 2 and the cover 6.

Means are provided for the convenient positioning of the heat sinks, and the proper alignment and positioning of their various terminals, and diodes, within the bracket 1. This includes, as can be seen in the base, integral upright columns, as at 22, formed upon the interior surfaces of the sidewalls for the base 2. Between each column there is located a slot, as at 23, as noted. There is also provided an independent, but integrally upwardly extending column 24, formed of the base 2. It also has a slot 25 provided therein, extending downwardly for a short distance. Each of these columns has dovetailed formed flanges, at their outer edges, as can generally be noted at 26. The columns could be formed as slots upon and extend inwardly from the side walls of the base, to provide one alternative form of mount.

Each of the heat sinks 4 and 5 have integrally formed upon the outer fins the shown slots 27. These also may be dovetailed in configuration, in cross section. They are designed for conveniently sliding onto the columns 22, during assembly. In addition, the inner fin of each heat sink has a dovetailed formed slot, as at 28, and these are designed for conveniently fitting upon the previously identified column 24, arranged generally at the midpoint of the base 2. Hence, as can readily be determined, the heat sinks conveniently fit within their alternator bracket, and can be readily removed in the event that a diode burnout occurs, as previously summarized.

As can be noted upon the cover 6, there are downwardly depending integral tabs 29, and these are designed for conveniently positioning within the various slots 23 and 25, to furnish further alignment for the various components during assembly of this isolator bracket. The integral tabs 29 press fit into the various slots 23 and 25 to further tighten the assembly between the base 2, cover 6, heat sinks 4 and 5, and all associated components.

As can also be seen in the various figures, the upper segment of the bracket 6 includes a pair of substantially sized openings 30 provided therethrough, while in addition, the bottom base of the bracket 2 likewise contains a pair of openings 31 therethough, and the purpose for these openings is to provide venting for the heat sinks disposed therein, which, as previousy explained, are normally exposed to excessive heat, from the diodes, during functioning of the alternator. In addition, as can be seen in FIG. 8, the upper segment 6 further includes a pair of ears, as at 32, and these include their apertures as shown, to provide accommodation for any other fastener, where the alternator bracket may be applied to another surface, nearby the alternator, rather than being mounted onto the alternator itself, where this may be inconvenient. As previously reviewed, because excessive heat is generated within this bracket during usage, it is desirable that the bracket itself be formed from a high temperature polymer, and preferably an injection molded polycarbonate, or other thermoplastic, may be useful for this purpose.

The foregoing provides an analysis of the construction, assembly, and usage and application for this isolator bracket, for use for incorporating alternators. Other variations or modifications to the subject matter of this disclosure may occur to those skilled in the art upon reviewing the description. Such variations are intended to be encompassed within the scope of any claims to patent protection issuing hereon. The description of the preferred embodiment provided herein, in addition to what is shown in the drawings, are set forth for illustrative purposes only.

Having thus described the invention, what is claimed and desired to be secured by Letters Patent is:

1. A battery isolator bracket incorporating two or more heat sinks, each of said heat sinks having a diode mounted thereto and for use for the conduct of current to at least a pair of batteries deriving their charge from an alternator, said alternator incorporating battery posts, a bracket, said bracket formed of a first segment partially enclosing said pair of heat sinks, a second segment that conforms to the first segment and encloses said heat sinks, each of said first and second segments forming said bracket having vent passages therethrough to dissipate the heat conducted to the heat sinks from their diodes during alternator operation, said bracket cooperating with fastening means for securing said bracket to a support, each of said heat sinks is formed of a series of integral fins, said fins being fan-shaped and located conformedly within said bracket, said bracket vent passage arranged at opposite sides of the bracket to expose the heat sinks to ambient air on opposing sides, each of the heat sinks provided with a diode attached thereto, a terminal extending from each diode, each terminal arranged for electrical connection to the alternator, the diode mounted on each heat sink electrically contacting its arranged terminal to regulate the conduct of charge generated within the alternator, through the diode, through its associated heat sink, and transmitting said charge to their respective batteries, the first segment of the bracket including mounting means, said enclosed heat sinks held in the bracket by said mounting means, each heat sink being fabricated of metal, and the bracket holding said heat sinks being formed of non-electrically conductive polymer, and said heat sink terminal connecting with the alternator battery post.

2. The invention of claim 1 wherein said support comprises the battery post of the alternator, and the fastening means comprises nuts for securing the bracket to the alternator battery post.

3. The invention of claim 1 wherein said support comprises a surface, and said fastening means comprises screws for securement of the bracket to said surface.

4. The invention of claim 1 wherein said mounting means comprises upright columns provided within said first segment, said heat sink having lateral slots to accommodate the columns therein when seating the heat sink within the bracket.

5. The invention of claim 4 wherein one of said mounting columns arranged intermediate the pair of heat sinks located within the bracket, said mounting columns having a height equivalent to the height of the said bracket, each adjacent heat sink having a slot formed therein, and which accommodates the locating of a part of the column therein during their emplacement within the bracket.

6. The invention of claim 1 wherein said washer and fastener securing said terminal to the alternator battery post.

7. The invention of claim 6 wherein said bracket having locating means provided thereon, and said washer cooperating with said locating means to fix the terminal and its heat sink in place within the bracket.

8. The invention of claim 1 wherein said second segment of the bracket having an integral lower surface, said surface having an aperture therethrough, and said lower surface disposed for mating contiguously with the first segment of the bracket when connecting the heat sink and its terminal to the alternator battery post.

9. The invention of claim 1 wherein there are a pair of adjacent heat sinks located within the bracket, each heat sink having one of said diodes and a terminal, each terminal having a slot, and the slots of each terminal being overlaid when connecting upon the alternator battery post.

* * * * *